(12) United States Patent
Garg et al.

(10) Patent No.: US 7,979,425 B2
(45) Date of Patent: Jul. 12, 2011

(54) SERVER-SIDE MATCH

(75) Inventors: Ashutosh Garg, Sunnyvale, CA (US); Mayur Datar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/552,751

(22) Filed: Oct. 25, 2006

(65) Prior Publication Data
US 2008/0104043 A1 May 1, 2008

(51) Int. Cl.
G06F 17/30 (2006.01)
(52) U.S. Cl. ........................................... 707/721
(58) Field of Classification Search .............. 707/100, 707/4, 721, 7
See application file for complete search history.

(56) References Cited

U.S. PATENT DOCUMENTS

| | | |
|---|---|---|
| 4,674,112 A | 6/1987 | Kondraske et al. |
| 4,754,474 A | 6/1988 | Feinson |
| 5,337,347 A | 8/1994 | Halstead-Nussloch et al. |
| 5,495,608 A | 2/1996 | Antoshenkov |
| 5,634,053 A | 5/1997 | Noble et al. |
| 5,634,134 A | 5/1997 | Kumai et al. |
| 5,701,469 A | 12/1997 | Brandli et al. |
| 5,724,593 A | 3/1998 | Hargrave et al. |
| 5,745,894 A | 4/1998 | Burrows et al. |
| 5,758,145 A | 5/1998 | Bhargava et al. |
| 5,818,437 A | 10/1998 | Grover et al. |
| 5,845,273 A | 12/1998 | Jindal |
| 5,915,251 A | 6/1999 | Burrows et al. |
| 5,945,928 A | 8/1999 | Kushler et al. |
| 5,953,073 A | 9/1999 | Kozina et al. |
| 5,953,541 A | 9/1999 | King et al. |
| 5,978,792 A | 11/1999 | Bhargava et al. |
| 6,011,554 A | 1/2000 | King et al. |
| 6,026,411 A | 2/2000 | Delp |
| 6,038,365 A | 3/2000 | Yamagami |
| 6,070,140 A | 5/2000 | Tran |

(Continued)

FOREIGN PATENT DOCUMENTS
CA 2511293 6/2004
(Continued)

OTHER PUBLICATIONS

Jun Gong and Peter Tarasewich, Alphabetically Constrained Keypad Designs for Text Entry on Mobile Devices, HCI Laboratory, College of Computer & Information Science, Northeaster University, pp. 211-212, Apr. 2-7, 2005.*

(Continued)

*Primary Examiner* — James Trujillo
*Assistant Examiner* — Amresh Singh
(74) *Attorney, Agent, or Firm* — Fish & Richardson P.C.

(57) ABSTRACT

Systems and techniques for converting numeric queries into substantially equivalent textual queries are described. In general, the systems and techniques discussed use search query logs to accurately select a most probably mapping for a numeric-to-text conversion. This mapping can occur when a system (e.g., a server-side search system) receives a series of numeric inputs (e.g., from a cell phone keypad) that may correspond to more than one word. For example, a search server may receive input 22737, which corresponds to both the words ACRES and CASES, as part of a query. The server uses current entries in query logs to create mappings for words from the numeric input. If recent queries indicate that the term ACRES is currently more popular than the term CASES, the mapping may match the entry 22737 to the text ACRES.

32 Claims, 5 Drawing Sheets

U.S. PATENT DOCUMENTS

| | | | |
|---|---|---|---|
| 6,131,082 A | 10/2000 | Hargrave et al. | |
| 6,169,999 B1 | 1/2001 | Kanno | |
| 6,226,635 B1 | 5/2001 | Katariya | |
| 6,247,010 B1 | 6/2001 | Doi et al. | |
| 6,256,630 B1 | 7/2001 | Gilai et al. | |
| 6,278,992 B1 | 8/2001 | Curtis et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,353,820 B1 | 3/2002 | Edwards | |
| 6,360,196 B1 | 3/2002 | Poznanski et al. | |
| 6,377,961 B1 | 4/2002 | Ryu | |
| 6,377,965 B1 | 4/2002 | Hachamovitch et al. | |
| 6,421,662 B1 | 7/2002 | Karten | |
| 6,453,315 B1 | 9/2002 | Weissman et al. | |
| 6,484,179 B1 | 11/2002 | Roccaforte | |
| 6,529,903 B2 | 3/2003 | Smith et al. | |
| 6,542,170 B1 | 4/2003 | Williams et al. | |
| 6,675,165 B1 | 1/2004 | Rothschild | |
| 6,714,905 B1 | 3/2004 | Chang et al. | |
| 6,947,770 B2 | 9/2005 | Rydbeck | |
| 6,968,179 B1 | 11/2005 | De Vries | |
| 7,103,854 B2 | 9/2006 | Fuchs et al. | |
| 7,120,574 B2 | 10/2006 | Troyanova et al. | |
| 7,149,550 B2 | 12/2006 | Kraft | |
| 7,159,191 B2 | 1/2007 | Koivuneimi | |
| 7,283,992 B2 | 10/2007 | Liu et al. | |
| 7,366,668 B1 | 4/2008 | Franz et al. | |
| 7,380,724 B2 | 6/2008 | Unruh | |
| 7,461,061 B2 | 12/2008 | Aravamudan et al. | |
| 7,529,741 B2 | 5/2009 | Aravamudan et al. | |
| 7,536,384 B2 | 5/2009 | Venkataraman et al. | |
| 7,539,676 B2 | 5/2009 | Aravamudan et al. | |
| 7,644,054 B2 | 1/2010 | Garg et al. | |
| 7,647,228 B2 | 1/2010 | Silvera et al. | |
| 7,657,526 B2 | 2/2010 | Aravamudan et al. | |
| 7,729,913 B1 | 6/2010 | Lee et al. | |
| 7,737,999 B2 | 6/2010 | Ardhanari et al. | |
| 7,739,280 B2 | 6/2010 | Aravamudan et al. | |
| 7,774,294 B2 | 8/2010 | Aravamudan et al. | |
| 7,774,341 B2 | 8/2010 | Aravamudan et al. | |
| 7,779,011 B2 | 8/2010 | Venkataraman et al. | |
| 7,788,266 B2 | 8/2010 | Venkataraman et al. | |
| 7,792,815 B2 | 9/2010 | Aravamudan et al. | |
| 7,835,998 B2 | 11/2010 | Aravamudan et al. | |
| 7,840,405 B1 | 11/2010 | Lee et al. | |
| 2002/0019731 A1 | 2/2002 | Masui et al. | |
| 2002/0021311 A1 | 2/2002 | Shechter et al. | |
| 2002/0038308 A1 | 3/2002 | Cappi | |
| 2002/0059069 A1 | 5/2002 | Hsu et al. | |
| 2002/0087514 A1 | 7/2002 | Payne et al. | |
| 2002/0152203 A1 | 10/2002 | Ostergaard et al. | |
| 2002/0184206 A1 | 12/2002 | Evans | |
| 2003/0035519 A1 | 2/2003 | Warmus | |
| 2003/0054830 A1 | 3/2003 | Williams et al. | |
| 2003/0073451 A1 | 4/2003 | Kraft | |
| 2003/0078914 A1 | 4/2003 | Witbrock | |
| 2003/0088554 A1 | 5/2003 | Ryan et al. | |
| 2003/0104839 A1 | 6/2003 | Kraft et al. | |
| 2003/0135490 A1 | 7/2003 | Barrett et al. | |
| 2003/0149686 A1 | 8/2003 | Drissi | |
| 2004/0163032 A1 | 8/2004 | Guo et al. | |
| 2004/0252051 A1 | 12/2004 | Johnson | |
| 2004/0261021 A1* | 12/2004 | Mittal et al. | 715/517 |
| 2005/0027524 A1 | 2/2005 | Wu et al. | |
| 2005/0060448 A1 | 3/2005 | Gutowitz | |
| 2005/0071332 A1* | 3/2005 | Ortega et al. | 707/4 |
| 2005/0102259 A1* | 5/2005 | Kapur | 707/1 |
| 2005/0114312 A1* | 5/2005 | Mosescu | 707/3 |
| 2005/0131687 A1 | 6/2005 | Sorrentino | |
| 2005/0188330 A1 | 8/2005 | Griffin | |
| 2005/0198056 A1 | 9/2005 | Dumais et al. | |
| 2005/0246365 A1 | 11/2005 | Lowsles et al. | |
| 2005/0270270 A1 | 12/2005 | Chadha | |
| 2005/0289141 A1 | 12/2005 | Baluja | |
| 2005/0289479 A1 | 12/2005 | Yoshida et al. | |
| 2006/0099963 A1 | 5/2006 | Stephens | |
| 2006/0142997 A1 | 6/2006 | Jakobsen | |
| 2006/0230350 A1 | 10/2006 | Baluja | |
| 2007/0061211 A1 | 3/2007 | Ramer | |
| 2007/0061244 A1 | 3/2007 | Ramer | |
| 2007/0061321 A1* | 3/2007 | Venkataraman et al. | 707/5 |
| 2007/0195063 A1* | 8/2007 | Wagner et al. | 345/169 |
| 2008/0104043 A1 | 5/2008 | Garg et al. | |
| 2010/0093404 A1* | 4/2010 | Baek et al. | 455/566 |

FOREIGN PATENT DOCUMENTS

| | | |
|---|---|---|
| EP | 0 597 611 | 5/1994 |
| EP | 1 072 984 | 1/2001 |
| KR | 01-2002-0084739 | 11/2002 |
| KR | 20030044940 A | 9/2003 |
| RU | 2039376 C1 | 9/1995 |
| WO | WO 98/00833 | 1/1998 |
| WO | WO 0075808 A1 | 12/2000 |
| WO | WO0180079 | 10/2001 |
| WO | WO 02/01400 | 1/2002 |
| WO | WO02/09302 | 1/2002 |
| WO | WO 03042879 | 5/2003 |
| WO | WO2005/091825 | 10/2005 |

OTHER PUBLICATIONS

"Problem 6-Mobile phones" ACM SPPC International Collegiate Programming Contest 2003, Sep. 20, 2003, http://www.sspcontest.org.2003/P6_Mobiles.pdf, 2 pages.

Wildstrom, Stephen H., "Honey, I Shrunk The Keyboard," BusinessWeek, Technology & You, May 10, 2004.

International Preliminary Report on Patentability for Application No. PCT/US2007/082534, dated May 7, 2009, 6 pages.

Resnik P.., et al., "The Web as a Parallel Corpus", Computational Linguistics MIT Press for Assoc. Comput. Linguistics USA, Jul. 2002, pp. 1-29, v. 29, No. 3.

Search Report from related European Patent Application No. 09151235.0 mailed May 4, 2009, 7 pages.

Official Decision of Grant from related Russian Application No. 2006114696 issued on Jan. 23, 2009.

Communication from related European Patent Application No. 09151235.0 mailed Jul. 6, 2009, 7 pages.

Australian Patent Office, Australian Application No. 2005259925, filed Jun. 24, 2005, in Office Action, mailed Feb. 18, 2010, 3 pages.

United State Patent and Trademark Office, U.S. Appl. 10/876,989, filed Jun. 30, 2005, in Office Action Mailed Jan. 3, 2007, 18 pages.

United State Patent and Trademark Office, U.S. Appl. 11/173,702, filed Jun. 30, 2005, in Office Action Mailed Aug. 13, 2007, 20 pages.

United State Patent and Trademark Office, U.S. Appl. 10/876,989, filed Jun. 30, 2005, in Office Action Mailed Sep. 18, 2007, 14 pages.

United State Patent and Trademark Office, U.S. Appl. 11/173,702, filed Jun. 30, 2005, in Office Action Mailed Apr. 1, 2008, 18 pages.

United State Patent and Trademark Office, U.S. Appl. 10/876,989, filed Jun. 30, 2005, in Office Action Mailed Jun. 6, 2008, 17 pages.

United State Patent and Trademark Office, U.S. Appl. 11/173,702, filed Jun. 30, 2005, in Office Action Mailed Dec. 29, 2008, 29 pages.

United State Patent and Trademark Office, U.S. Appl. 10/876,989, filed Jun. 30, 2005, in Office Action Mailed Mar. 9, 2009, 23 pages.

United State Patent and Trademark Office, U.S. Appl. 11/173,702, filed Jun. 30, 2005, in Office Action Mailed Aug. 17, 2009, 18 pages.

United State Patent and Trademark Office, U.S. Appl. 10/876,989, filed Jun. 30, 2005, in Office Action Mailed Dec. 22, 2009, 23 pages.

European Patent Office, Supplementary European Search Report & Written Opinion for Application No. EP 05763513.8, mailed Jul. 23, 2009, 3 pages.

Young, W Lee, Authorized Officer, International Searching Authority, International application No. PCT/US2006/26152, filed Jun. 30, 2006, in International Search Report and Written Opinion, mailed Feb. 11, 2008, 9 pages.

Kuwahara, Yoshiko, Authorized Officer, International Bureau of WIPO, International application No. PCT/US2006/26152, filed Jun. 30, 2006, in International Preliminary Report on Patentability, mailed Mar. 26, 2009, 7 pages.

Whitfield, A Jacqueline, Special Project Assistant, International Searching Authority, filed Jun. 24, 2005, in Intentional Search Report and Written Opinion, mailed Sep. 7, 2005, 13 pages.

United State Patent and Trademark Office, U.S. Appl. 11/173,702, filed Jun. 3, 2005, in Office Action Mailed May 11, 2010, 17 pages.

Office Action issued in Chinese Patent Application No. 200680031513.2, May 24, 2010.

Office Action issued in Korean Patent Application No. 2006-7006282, Mar. 10, 2011.

* cited by examiner

SERVER-SIDE MATCH

TECHNICAL FIELD

This specification relates to generating text and, more particularly, to generating text based on numerical input.

BACKGROUND

As computers and computer networks become more and more able to access a wide variety of information, people are demanding more ways to obtain that information. Specifically, people now expect to have access, on the road, in the home, or in the office, to information previously available only from a permanently connected personal computer hooked to an appropriately provisioned network. They want stock quotes and weather reports from their cell phones, e-mail from their personal digital assistants (PDAs), up-to-date documents from their palm tops, and timely, accurate search results from all their devices. They also want all of this information when traveling, whether locally, domestically, or internationally, in an easy-to-use, portable device.

Portability generally requires a device small in size, which in turn limits the number of data entry keys and the amount of memory and available processing power. In addition, ultra portable devices often must be held in one hand or not held at all, so that data entry must be one-handed or no-handed. These limitations in the device generally must be compensated for by the user. For example, the user may have to use a limited keyboard such as a telephone keypad, or limited speech recognition capabilities. Such constrained devices may force a user to learn special tricks for data entry (such as shorthand writing on a PDA) or may generate data that the user never intended, by making inaccurate guesses at ambiguous data entries.

Some attempts to solve these problems have been made. For example, PDAs have been programmed to recognize shorthand and longhand writing. However, the recognition accuracy may be poor, and writing on a small mobile device may be difficult for users. Also, cell phones can recognize entered letters, even though the presence of three letters on each key can create ambiguities about the intended text, such as by allowing the user to press key combinations, either simultaneously or in sequence (e.g., triple tap). However, methods that include pressing key combinations, such as triple tap, may require a user to generate substantially more keystrokes than if the user had access to a keyboard. The increase in keystrokes may slow down a user's interaction with the device and discourage retrieving and entering information using mobile devices.

SUMMARY

This specification describes systems and techniques for converting numeric queries into substantially equivalent textual queries. In general, the systems and techniques discussed use search query logs to accurately select a most probably mapping for a numeric-to-text conversion. This mapping can occur when a system (e.g., a server-side search system) receives a series of numeric inputs (e.g., from a cell phone keypad) that may correspond to more than one word. For example, a search server may receive input 22737, which corresponds to both the words ACRES and CASES, as part of a query. The server uses current entries in query logs to create mappings for words from the numeric input. If recent queries indicate that the term ACRES is currently more popular than the term CASES, the mapping may match the entry 22737 to the text ACRES.

In a first general aspect, a computer-implemented method for matching text queries to corresponding numerically queries is described. The method includes receiving a plurality of text queries at a server from a plurality of users, generating a numerically equivalent query for each text query of the plurality of text queries by mapping symbols of the text query to associated numbers using a keypad standard that specifies associations between symbols and numbers, generating a primary mapping between each numerically equivalent query and a text query having a substantially highest frequency of occurrence among text queries associated with the numerically equivalent query, and outputting a primary mapped text query in response to receiving an associated numerically equivalent query transmitted from a user.

In certain embodiments, the method can include generating additional mappings between the numerically equivalent query and additional text queries based on the whether a frequency of occurrence for the additional text queries exceeds a predetermined occurrence threshold. The method may also include outputting the additional text queries with the primary mapped text query. Additionally, the outputting can include transmitting the primary mapped text query for display to the user.

In a second general aspect, a system is described. The system includes means for generating a numerically equivalent query for each of a previously stored text query by mapping symbols of the text query to associated numbers using a keypad standard that specifies associations between numbers and symbols, a frequency calculator to calculate a frequency of occurrence for each stored text query, and a mapper to generate a mapping between the numerically equivalent query and a text query with a substantially highest frequency of occurrence among text queries associated with the numerically equivalent query.

In a third general aspect, a method for generating text queries based on numerically equivalent queries input by users is described. The method includes generating numerically equivalent queries based on text queries by representing each symbol of a text query using a number, mapping a text query having a greatest frequency of occurrence among the text queries corresponding to a numerically equivalent query, and outputting the mapped text query in response to receiving the correspondent numerically equivalent query from a user.

The systems and techniques described here may provide one or more of the following advantages. First, the system can permit mapping text queries to numerical queries based on the text queries' current frequency of occurrence, which may increase the accuracy of numeric-to-text conversion. Second, the system can increase the ease of applying numeric-to-text conversion internationally by accessing a text query corpus of a particular language based on a location of a user submitting a numeric query. Third, a system can increase accuracy of numeric-to-text conversion by accessing a particular text query corpus based on a context (e.g., news search context, image search context, etc.) in which a user submits a numeric query. Fourth, a system may dynamically update text that is mapped to numeric queries based on recently received text queries from users. Fifth, numeric-to-text conversion accuracy can be increased by selecting particular segmented text query corpuses (e.g., segmented by country, language, time, users, group of users, etc.), and defaulting to a superset segment if a selected segmented text query corpus does not include enough data.

The details of one or more embodiments of the text-to-conversion feature are set forth in the accompanying drawings and the description below. Other features and advantages of the text-to-conversion feature will be apparent from the description and drawings, and from the claims.

DESCRIPTION OF DRAWINGS

Like reference symbols in the various drawings indicate like elements.

DETAILED DESCRIPTION

Figure 1:
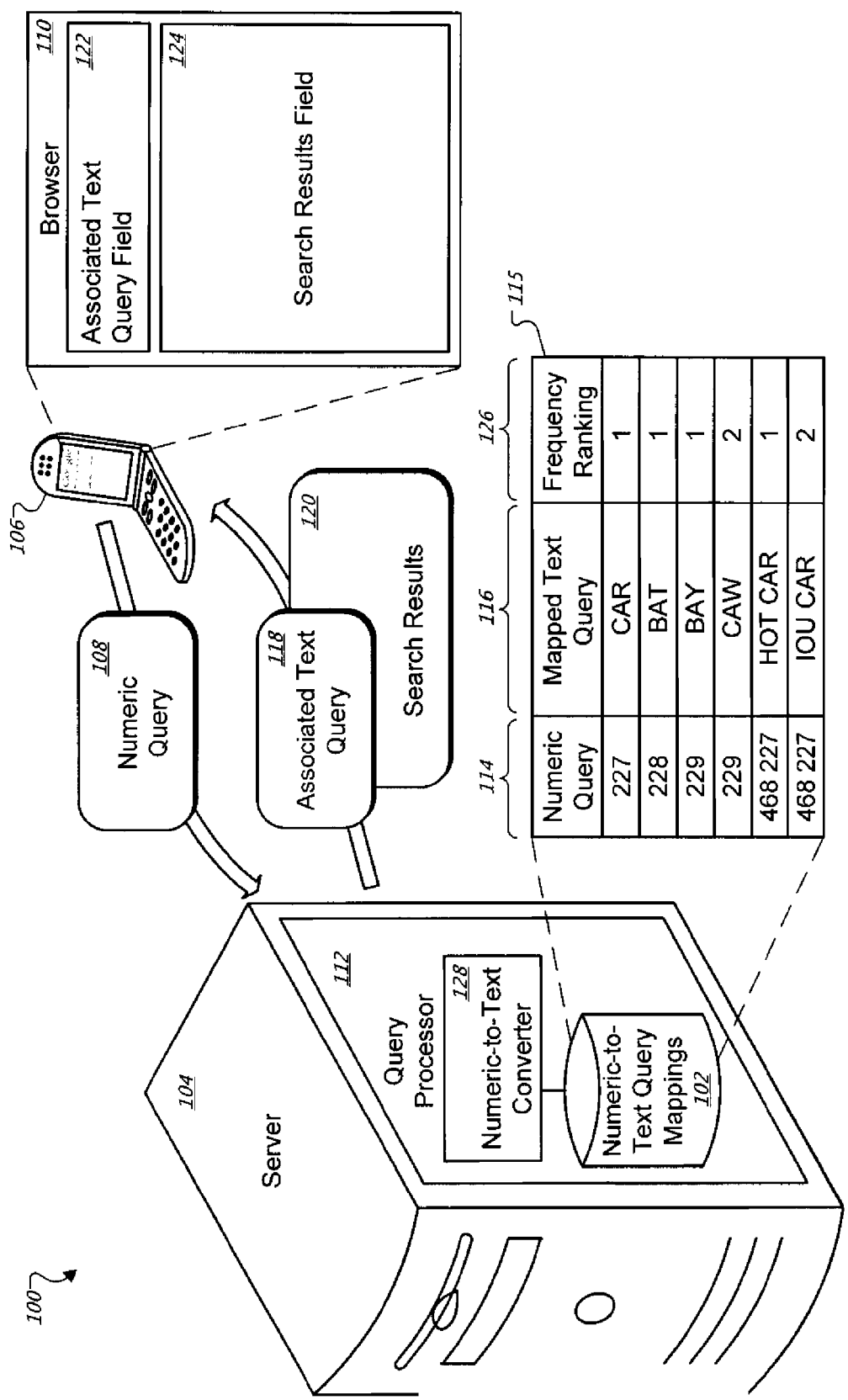
FIG. 1 shows an example system for converting numeric queries to text queries using numeric-to-text query mappings maintained on a server.

FIG. 1 shows an example system that uses search query logs to select the most probably mapping for a numeric-to-text conversion. This mapping can occur when the server receives a series of numeric inputs (e.g., from a cellular phone keypad) that may correspond to more than one word. For example, the server can receive the input "22737" as part of a query, however, this numerical series can correspond to both the words "ACRES" and "CASES." The server can use current entries in query logs to create mappings for words from the numeric input. If recent queries indicate that the term "ACRES" is currently more popular than the term "CASES," the mappings can match the entry "22737" to the text "ACRES."

More specifically, FIG. 1 shows an example system 100 for converting numeric queries to text queries using numeric-to-text query mappings 102 maintained on a server 104. In one implementation, a computing device 106 transmits a numeric query 108 to the server 104. The numeric query 108 can be translated into text using the mappings 102. The text can then be used, for example, in a search which generates results that are returned to the computing device 106.

The computing device 106 can be a cellular phone running a web browser 110. The user may input a numeric search query instead of entering a text search query into the cellular phone because entering text using the cellular phone's keypad may require depressing a key multiple times to select a desired letter. For example, each key on a cellular phone's keypad can be assigned three or four letters. Some keypads indicate such mapping of the letters to the numeric keys by printing the letters on the numeric keys. For example, the letters "ABC" can be printed on a cellular phone's "2" key. Similarly, the remaining letters can be mapped to the remaining numeric keys. To enter the text query "CAR," for example, a user can use the triple tap method, where the user presses "222" to enter the letter "C," "2" to enter the letter "A," and "777" to enter the letter "R."

A user, however, entering a numeric search query may only have to press each key once because a single key can represent any one of the letters assigned to it. For example, a user can select the letter A, B or C by pressing the "2" key of the keypad. Using this method, a user can enter a numeric search "227," which represents the term "CAR." Pressing 2+2+7 for the text "CAR" may be more convenient than entering 222+2+777 (for "C"+"A"+"R"). The mappings 102 then can be used to disambiguate what text the numeric query "227" may represent.

The numeric query 108 can be transmitted over a network, such as the Internet, and received by the server 104. A query processor 112, executing within the server 104, can process the numeric query 108. To aid in processing numeric queries, the query processor 112 can use information included in the numeric-to-text query mappings 102. Such information can be stored, for example, in a mappings table 115.

If a text search query corresponding to the numeric query 108 has previously been processed by the server 104, the query processor 112 can access a corresponding row (e.g., containing "227") in the numeric-to-text query mappings 102 to look up an associated text query 118 (e.g., "CAR") from a mapped text query column 116. The server 104 can then return the associated text query 118, such as "CAR," along with search results 120 matching the associated text query.

Having entered the three digits "227" as the original numeric query 108, the user of the computing device 106 can see the results of a search generated using the text "CAR" in the web browser 110. In certain implementations, an associated text query field 122 of the web browser 110 can display the numeric-to-text translation "CAR" derived from the mappings 102, and a search results field 124 can display web content associated with the search results 120 generated using the translated text.

In other implementations, the associated text query 118 can be returned and displayed on the computing device 106 without generating the search results 120. The user can confirm the associated text query 118 is the text the user wanted to enter, and the confirmation (or associated text query) can be transmitted to the server 104 to generate the search results 120. Additionally, the server 104 can transmit multiple associated text queries from which the user can select. The associated text query selected by the user can be used by the server 104 to generate the search results 120. This is described in more detail below.

Some numeric queries 108 can translate into more than one text query, for example "229." The numeric query "229" is ambiguous because it can translate to "BAY," "CAW," "CAY," etc. In one implementation, the server 104 disambiguates numerical queries using a frequency ranking that reflects a number of times an associated text query occurs in a stored log of text queries. For example, two of the translations, "BAY" and "CAW," are represented as rows in the mappings table 115 used for the numeric-to-text query mappings 102. Both rows have "229" in their numeric query columns 114. Using the mappings 102, the numeric query "229" can be translated as "BAY" or "CAW." To facilitate selection of the most probable associated text query, the query processor 112 can access a frequency ranking column 126. The frequency ranking 126 for "BAY" is "1," indicating a higher frequency ranking than that for "CAW," which has a frequency ranking of "2." In this case, the query processor 112 can make a probabilistic determination that the numeric query "229" represents "BAY."

Some numeric queries 108 may not have corresponding entries in the numeric-to-text query mappings 102. For example, the numeric query 108 may be a string of digits which represent a string of uncommon words. If the query processor 112 has no past text queries on which to base its processing, the query processor 112 can use a numeric-to-text converter 128 and a language model not derived from textual server query logs to formulate a probable corresponding text query. For example, the numeric-to-text converter 128 can determine a probable corresponding text query using occurrence information from a language model corpus used in standard voice recognition programs.

In certain implementations, numeric search queries can have more than one search term. For example, a numeric search query can include several terms delimited by, for example, an asterisk symbol, which represents a space between the terms.

In other implementations, the system 100 can be configured to make use of information from text queries it receives over time. The system 100 can update the numeric-to-text query mappings 102 using information from text-based search queries. The numeric-to-text mappings can also be updated based on the text corpus that is used for searching, for example, web-pages that are crawled and indexed by a search engine. In certain implementations, the frequency rankings are updated on a periodic or predetermined basis using new textual queries received since the last update of frequency rankings. The newly received text queries can be examined and statistical information on the occurrence of query terms can be used to supplement existing statistical models of frequency occurrence for the associated query terms. This may offer an advantage of dynamically updating the ability of the system to accurately disambiguate numeric queries based on recently received text queries.

In other implementations, the frequency rankings can be generated using a previously collected corpus of text queries, such as historical query logs. The frequency rankings then can be updated using the previously collected corpus as described above.

Figure 2:
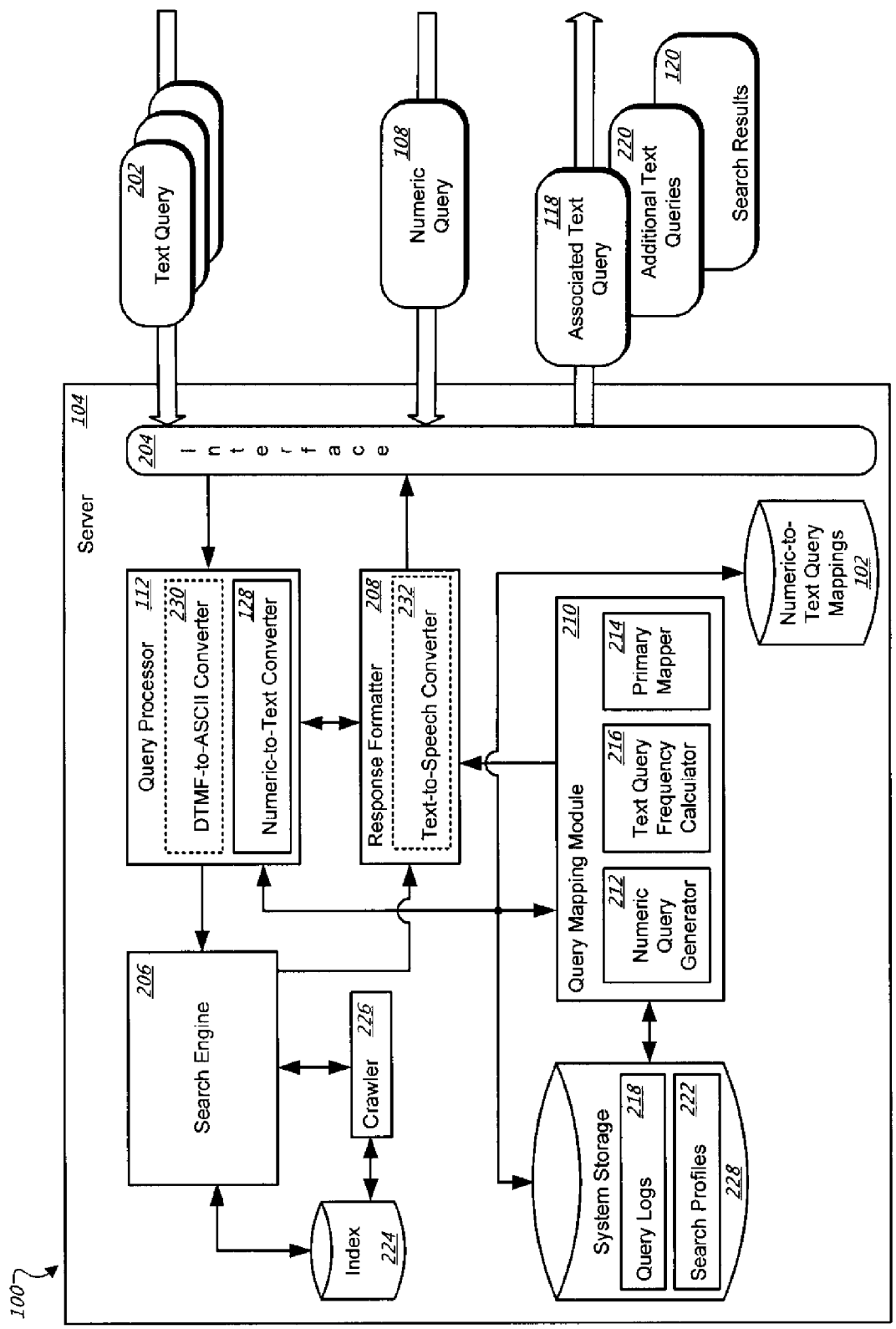
FIG. 2 shows a portion of the system of FIG. 1 in more detail.

FIG. 2 shows a portion of the system 100 of FIG. 1 in more detail. For example, FIG. 2 shows additional detail within the server 104, according to one implementation. The system 100 can receive text queries 202 in addition to the numeric queries 108. The system 100 can be implemented, for example, as part of an Internet search provider's general system. The system 100 can obtain information about occurrence and concurrence of terms included in submitted text queries.

The server 104 includes an interface 204 that allows communications in a variety of ways. For example, server 104 can be communicatively connected to a network such as the Internet, and thereby communicate with various devices, such as server farms, wireless communication devices, personal computers, and cellular phones. The communication flow for any device can be bidirectional so that server 104 can receive information, such as commands, from the devices, and can send information to the devices.

Requests received from devices can be provided to the query processor 112, which can interpret a request, associate it with predefined acceptable requests, and pass it on, such as in the form of a command to another component of system 100 to perform a particular action. For example, where the request includes a search query, the query processor 112 can cause a search engine 206 to generate search results corresponding to the search request. The search engine 206 can use data retrieval and search techniques, such as those used by the Google PageRank™ system. The results generated by the search engine 206 can then be provided to the original requester using a response formatter 208, which carries out formatting on the results.

When the type of search query received by the server 104 is a text query 202, the server 104 can update its numeric-to-text query mappings 102 in addition to returning the search results 120. In particular, the numeric-to-text query mappings 102 can be updated as text queries 202 are received over time. These updates can occur in real time or on a periodic or predetermined basis. For example, the server 104 may receive a text query 202, such as "HOT CAR," from the browser 110 executing on a user's cellular phone. The query processor 112 can "recognize" the search query "HOT CAR" as a text query, as opposed to a numeric query, because it contains, for example, American Standard Code for Information Interchange (ASCII) representations of one or more letters, as opposed to being composed of ASCII representations of digits.

The query mapping module 210 can maintain up-to-date numeric-to-text query mappings 102 based on the text query 202 that the server 104 receives. One component of the query mapping module 210, a numeric query generator 212, can determine an equivalent numeric query corresponding to each text query 202 it receives. The determination can be based on keypad standards, such as those employed to map letters to their corresponding numeric keys on a cellular phone's keypad, and can further be language specific. For example, the letter H is mapped to the numerical equivalent "4" key on a cellular phone using the Mobile 1 keypad standard. The remaining letters and space in the text "HOT CAR" are converted using the Mobile 1 keypad standard.

In other implementations, other keypad standards can be used to convert the incoming text query to a numerical representation, such as the International Standard, the North American Classic, the Australian Classic, and the United Kingdom (UK) Classic.

Using these and previously discussed considerations, if the numeric query generator 212 receives a text query 202 containing "HOT CAR," it can determine using the Mobile 1 keypad standard that the corresponding equivalent numeric query is "468 227." As shown in FIG. 1, the query mapping module 210 can update a row in the numeric-to-text query mappings 102 with the value "468 227" in the numeric query column 114 and the value "HOT CAR" in the mapped text query column 116. Such an update may include incrementing a count column (not depicted in the mappings table 115) to indicate the receipt of an additional instance of the search query "HOT CAR." In certain implementations, such count columns may be compared periodically to adjust frequency rankings 126 of entries in the mappings table 115. Of course, the description of the mappings table 115 is for the purposes of illustration and is not intended to limit the data structures within which the mapping information can be stored. In other implementations, the mapping information can be stored in various other data structures, e.g., arrays, tree structures, matrices, etc.

Over time, the server 104 can receive numerous additional text queries 202 (e.g., "GOT CAR," "IOU CAP," etc.) which have the equivalent numeric query "468 227" as "HOT CAR." The query mapping module 210 can use information from these additional text queries 202 to update the numeric-to-text query mappings 102.

As described in association with FIG. 1, the server 104 can receive numeric queries 108. It can be advantageous to store and maintain information based on text queries 202 to make probabilistic determinations regarding which text queries map to received numeric queries 108. These determinations can be based on frequencies that particular terms occur in received search queries.

A text query frequency calculator 216 can maintain and use frequency counts of individual search queries received over time by the server 104. A search query's frequency count can represent the occurrence of the search query, or the occurrence of the terms within the search query when it contains multiple terms. The frequency counts can be used to calculate and maintain up-to-date frequency rankings 126 (see FIG. 1) in the mappings table 115. For example, mapped text queries 116 "BAY" and "CAW" in the mappings table 115 share the same "229" entry in the numeric query column 114, but the entries have different frequency rankings 126. In particular, the "BAY" entry in the mappings table 115 has a higher frequency ranking of "1." In this case, the higher ranking of "1" may be attributed to a greater occurrence rate of "BAY" in search queries over its counterpart "CAW," which has a frequency ranking of "2."

In certain implementations, recently received text queries or terms within multiple-term text queries can be more heavily weighted in the frequency rankings than text queries or terms received at an earlier time. This can increase a frequency ranking of the recently received text queries or terms above a frequency ranking of earlier received text queries or terms despite a greater occurrence of the earlier received queries or terms relative to the recently received ones.

Using a text query frequency calculator 216 to maintain frequency rankings of search queries received over time by the server 104, the system 100 can disambiguate numeric queries 108 corresponding to the same mapped text queries. To aid in determining (and maintaining over time) the primary text query associated with each particular numeric query, the query mapping module 210 can include another component, a primary mapper 214, which will now be described.

The primary mapper 214 can determine, for a particular numeric query 114, the "primary" mapped text query 116 associated with it. Designating a "primary" mapped text query can be used to determine the most probable text query 116 for a particular numeric query 108 received by the server 104. For example, when the mappings table 115 contains more than one row having the same numeric query 114, such as "229" of FIG. 1, the primary mapper 214 can designate one of the mapped text queries 116 as the primary mapped text query. In certain implementations, the primary mapper 214 can select a term or search query having the highest frequency ranking 126, making it the primary mapped text query. In other implementations, the primary mapper 214 may use the frequency rankings 126 in conjunction with additional information (not depicted in the mappings table 115), such as assigning a higher ranking to mapped text queries generally received more recently, as described above.

The primary mapper 214 can automatically designate a mapped text query 116 as a "primary" mapped text query when just one row exists in the mappings table 115 for its corresponding numeric query 114. For example, the numeric query "227" shown in FIG. 1 has only one associated mapped text query 116 "CAR" in the mappings table 115, so that the primary mapper 214 designates that text query 116 as the primary one. However, the numeric query "228" has two associated mapped text queries 116 "BAY" and "CAW." In this case, the primary mapper 214 can determine that the mapped text query 116 "BAY" is the "primary" mapped text query because its frequency ranking is higher (e.g., "1" compared to "2" for the "CAW" entry). Having a primary mapped text query for each of the numeric queries 114 in the mappings table 115 can aid in resolving ambiguities for numeric queries 108 received by the server 104. For example, when the server 104 receives an ambiguous numeric query 108 such as "228," the server 104 can select "BAY" as the most probable match to the numeric query 108 if "BAY" is the "primary" mapped query.

As the server 104 receives additional text queries 202 over time, the query mapping module 210 can update the mappings table 115 as needed to maintain updated frequency rankings 126 and designations of the primary mapped text query for each numeric query 114. In certain implementations, the system 100 can additionally make use of frequencies of text queries processed by the server 104 before the system 100's installation. For example, it can be advantageous to use information from stored text queries 202 received by the server 104 in a period before the system 100's installation.

In certain implementations, during a conversion process coinciding with installation of the system 100, the query mapping module 210 can analyze query logs 218 representing past queries for use in updating the numeric-to-text query mappings 102. The analysis can determine frequencies of text-only queries processed by the server 104 during a time frame before the system 100 is used to convert numeric queries to text queries. For example, the system 100 can analyze the query logs 218 to determine frequencies of past text queries, such as "HOT CAR," as well as other previous search queries.

In certain implementations, during the conversion process, the system 100 can use the text query frequency counter 216 to aid in identifying and removing from consideration individual search queries having frequency counts that fall below a pre-defined threshold. For example, while it may be useful to consider past search queries, such as "HOT CAR," that have high frequency counts (e.g., several millions), seldom-used past search queries having extremely low frequency counts may be omitted from the table because they may be less likely to be reissued in future numeric queries 108. By limiting initial numeric-to-text query mappings 102 to higher frequency past text queries, the conversion process can store information in the mappings 102 representing more probabilistic future numeric queries.

During the conversion process, as information regarding past text queries is processed from the query logs 218, the numeric query generator 212 can generate equivalent numeric queries for each processed text query. For example, for a text query stored in the query logs 218, such as "HOT CAR," the numeric query generator 212 can calculate an equivalent numeric query "468 227" using a translation standard as described above, and a row in the mappings table 115 can be created or updated to include information related to the text query.

In certain implementations, frequency counts for the text queries can be maintained substantially simultaneously to the processing of the query 108. After each of the text queries has been assigned an equivalent numeric query, the primary mapper 214 can use the frequency counts to compute frequency rankings 126.

As a result of the conversion process, the numeric-to-text query mappings 102 can include columns and rows substantially similar to those included in the mappings table 115, and they can include additional columns (not shown in FIG. 1) that facilitate future maintenance of the numeric-to-text query mappings 102. This maintenance (e.g., maintaining the most frequently issued textual query as the primary mapped query for a numerical query) can occur, for example, as the server 104 processes additional text queries over time, or as the server 104 processes numeric queries 108.

When the server 104 receives a numeric query 108 for processing, the query processor 112 can determine if the numeric query 108 is represented by one or more entries in the mappings table 115. For example, the numeric query 108 may be in the mappings table 115 if the associated text query has been processed previously by the server 104. If so, the query processor 112 can access one or more corresponding rows within the mappings table 115. The response formatter 208 can use information from the corresponding rows to provide a response to the numeric query's originator.

For example, if the numeric query 108 is "228," the query processor 112 can look up the mapped text query 116 "BAT" because its numeric query field 114 matches the numeric query 108 "228." However, when the mappings table 115 contains two or more rows matching the numeric query 108, the query processor 112 can resolve the ambiguity by selecting the "primary" mapped text query, which has the highest frequency ranking 126. For example, if the numeric query 108 is "229," the query processor 112 can select the "primary" mapped text query "BAY," because it has a higher frequency ranking than that of "CAW." The response formatter 208 can transmit the selected text query as the associated text query 118 to the originator of the search query.

When the server 104 receives a numeric query 108 having multiple search terms, the query processor 112 can use the entire numeric query to look up a mapped text query 116 in the mappings 102. In certain implementations, the query processor 112 may divide the numeric query 108 into various combinations of its constituent terms, and process each term separately or in various combinations. For example, a numeric query 108, such as "468 639 227" (representing the text "HOT NEW CAR"), has three search terms. The query processor 112 can divide the numeric query 108 "468 639 227" for processing in various ways. In one example, the mappings table 115 includes a "HOT CAR" entry, but no entry for "HOT NEW CAR." To process "468 639 227" in this example, the query processor 112 can split the query into two components: "468 227" and "639." In this case, the query processor 112 can use "468 227" to look up the associated mapped text query 116 "HOT CAR". For the remaining "639" term, the query processor 112 may access the mappings 102 to identify the associated text query "NEW." The system may generate "NEW" instead of other possibilities, such as "MEW," using frequency rankings 126 in the mappings table 115 for rows containing mapped text queries 116 "NEW" and "MEW" (not shown in FIG. 1). The query processor 112 can combine the two text query terms, and provide them to the search engine 206 to find matching search results 120.

In certain implementations, if the numeric query 108 is ambiguous, the response formatter 208 can transmit a group of text queries 220 in addition to the search results 120. This can be useful, for example, if more than one mapped text query 116 has a high probability of matching the user's intent. For example, if the numeric query 108 is "229," the additional text queries 220 can include "CAW" and any other mapped text queries whose numeric query 114 in the mappings table "229." The user can then select the desired term form the group of text queries.

In other implementations, the query processor 112 can access user search profiles 222 to affect how a particular user's text query 202 is processed. The search profiles 222 can contain information for each user (e.g., where the user opts to be identified based on IP address or cookies) regarding patterns of search queries issued over time. For example, while some users may have issued queries related to automobiles, others may have not issued such queries. The type of information contained in the search profiles 222 can be user-specific, while the information maintained in the numeric-to-text query mappings 102 may be based on a compilation of submitted text queries from multiple users. While processing a numeric query 108 for a particular user, the query processor 112 can give partial consideration to the information contained for that user in the search profiles 222. By doing this, a user who previously searched using terms relating to automobiles may have terms related to automobiles more heavily weighted than other users. For example, if the user submits a numeric query "228," the system may increase the frequency ranking for the term "CAR" above the term "BAR" because of the user's previous searches relating to automobiles.

When the server 104 receives a numeric query 108 that is not represented in the numeric-to-text query mappings 102, the numeric-to-text converter 128 can determine an associated text query 118 by using the numeric-to-text converter 128. In certain implementations, the system may determine more than one associated text query 118 and provide the user with list of possible text translations for user selection.

The server 104 may include additional components that facilitate processing queries in other ways. In certain implementations, the query processor 112 includes a DTMF-to-ASCII Converter 230. Dual-tone multi-frequency (DTMF) refers to the signal generated when a digit on a telephone's keypad is pressed. The DTMF-to-ASCII converter 230 can process these DTMF signals and create numerical ASCII equivalents that can be used by the search engine 206 in generating corresponding search results 120. For example, a user can press multiple digits on a cellular phone to formulate a search query such as "468 228." Here, the search query received by the server 104 is a series of DTMF tones. The DTMF tones can be used to generate numerical equivalents used by the query mapping module to determine corresponding text queries.

In certain implementations, the response formatter 208 can include a text-to-speech converter 232 for synthesizing speech corresponding to the search results 120. For example, referring to FIG. 2, instead of the response formatter 208 formatting textual search results 120 in response to a numeric query 108, the text-to-speech converter 232 can instead create synthesized speech, which verbalizes the search query results (or a portion of the search query results). In this way, a user of a computing device having a limited display, such as a cellular phone, can instead "listen" to the results of a search query.

In other implementations, the response formatter 208 can use the text-to-speech converter 232 to aid the user in confirming the numeric-to-text translation of the user's numeric query 108. For example, if the numeric query 108 is "468 228," the text-to-speech converter 232 may create a confirmation message such as "Did you mean 'HOT CAR?'" that may be transmitted to the user's cellular phone.

In certain implementations, the user can confirm by verbalizing confirmation (or rejection) of the text translation when prompted by the server. In other implementations, the user can select a control on the computing device (e.g., a key on a cellular phone's keypad) to confirm or reject the text query.

The server 104 can include the search engine 206, which in turn can include multiple components. The search engine 206 can access an index 224 of web sites instead of searching the web sites themselves each time a search request is made, which can make the searching more efficient. The index 224 can be populated using information collected and formatted by a web crawler 226, which can continuously scan potential information sources for changing information.

The server 104 also may access system storage 228 as necessary. System storage 228 can include one or more storage locations for files needed to operate the system, such as applications, maintenance routines, management and reporting software, etc.

Figure 3:
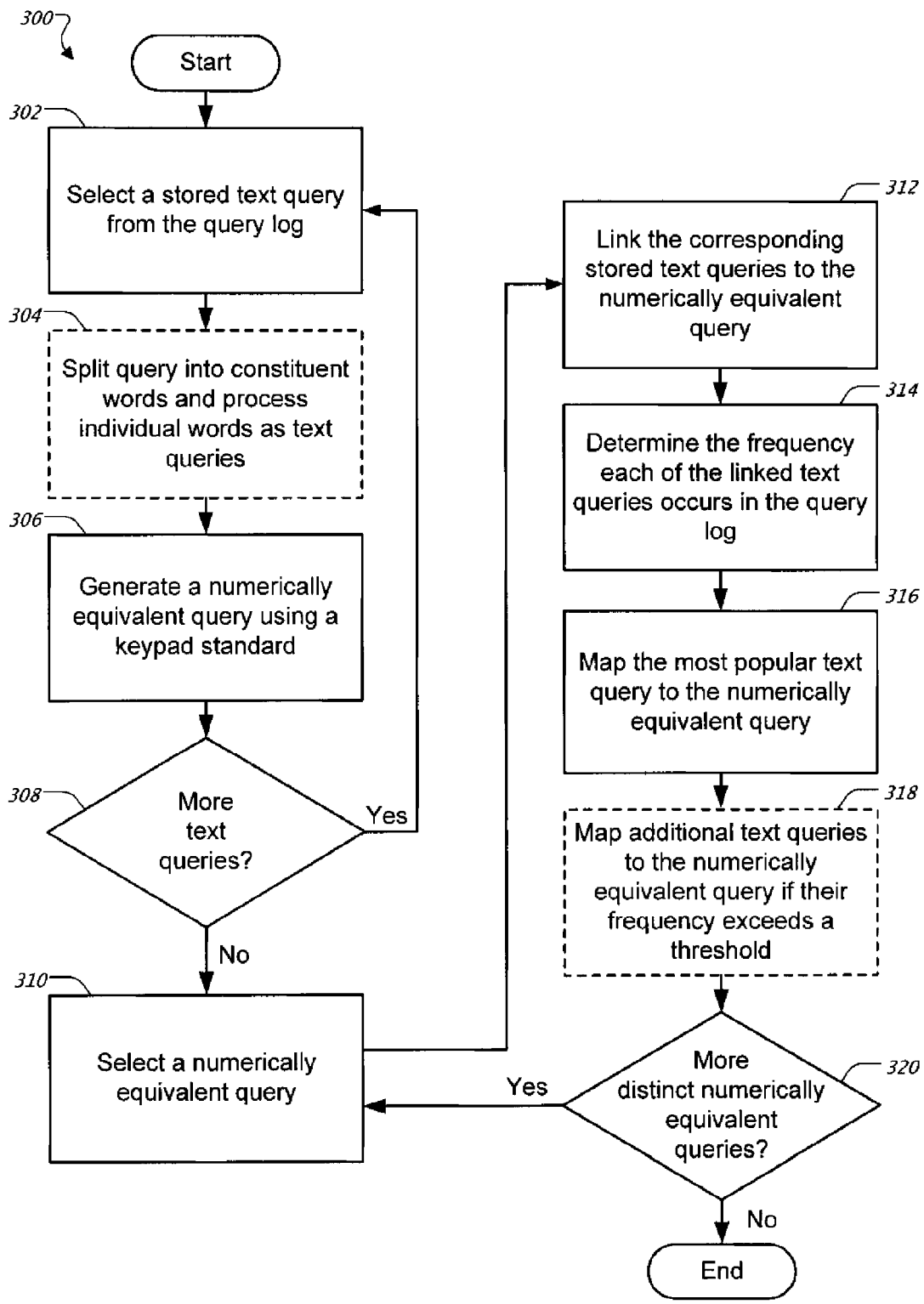
FIG. 3 is a flow chart of an illustrative method for using text-based query logs to generate numeric-to-text query mappings.

FIG. 3 is a flow chart of an illustrative method 300 for using text-based query logs to generate numeric-to-text query mappings 102 in FIG. 2. The method 300 can be used during a conversion process coincident with the installation of the system 100. During such a conversion process, the information from past text-based search queries can be examined to produce information usable by the system 100 in processing numeric search queries. For example, referring to FIG. 2, the conversion process can pre-populate the numeric-to-text query mappings 102 for use by the server 104 for processing numeric queries 108. Such mappings 102 can allow the server 104 to make more efficient use of information gained from past text queries 202 that occurred prior to the system 100's installation.

Processing can start in step 302 when a stored text query is selected from a query log. For example, referring to FIG. 2, a set of query logs 218 can store information from past text queries 202 received by the server 104. Such entries can represent search queries comprising the full-text search terms of text queries 202. For example, one such entry in the query logs 218 may represent the text query 202 for "HOT CAR" that may have been received by the server 104 several months prior to the conversion process. The exemplary search query "HOT CAR" has two terms ("HOT" and "CAR"), although in general a search query represented by an entry in the query logs 218 can have from one to several search terms.

Upon examination of the search query "HOT CAR," the conversion process can use the entire search query, combinations of its multiple search query terms, or both, when it creates numeric equivalents. In optional step 304, a search query having multiple terms can be split into constituent words for the purposes of processing each as an individual search term. For example, search query "HOT CAR" can be split into "HOT" and "CAR" text query terms. In certain implementations, the conversion process can split a multi-term search query into various combinations of search terms, including single-word search terms. As a result of steps 302 and 304, a two-term search query such as "HOT CAR" may result in one text query ("HOT CAR"), two text queries ("HOT" and "CAR"), or three text queries ("HOT CAR," "HOT," and "CAR"). After splitting a multiple term search query, the corresponding text queries can be used to generate numeric queries.

In step 306, numerically equivalent queries are generated from text queries of previous steps using a keypad standard. For example, the entire stored text query from step 302, as well as any text queries that step 304 produced by splitting multiple-term search queries into constituent terms can be processed. For each term in a text query, the conversion process assigns a numeric equivalent query based on a keypad standard. For example, referring to FIG. 2, the numeric query generator 212 can generate numerically equivalent queries "468" and "227" from the text queries "HOT" and "CAR," respectively. In particular, using the Mobile 1 keypad standard, the "H" in "HOT" translates to a "4," the "O" translates to a "6," and the "T" translates to an "8." Similarly, a two-term text query such as "HOT CAR" can translate to the numerically equivalent query "468 227" using the Mobile 1 keypad standard. Although examples here show the use of spaces to separate numeric query terms, other implementations may use different symbols or methods to separate the terms.

In step 308, a determination can be made whether the query log contains additional stored text entries yet to be processed. For example, referring to FIG. 2, the system 100 can determine if additional unprocessed entries exist in the query logs 218. If yes, the conversion process can repeat steps 302 to 306 for additional entries. Otherwise, if there are no more unprocessed text queries, the method can move to step 310.

In step 310, the system selects a numerically equivalent query previously generated in step 306. For example, the system 100 may select the numerically equivalent query "468 227" representing the stored text query "HOT CAR" in the query logs 218. However, the numerically equivalent query "468 227" selected here can represent various other stored text queries, such as "IOU CAP," that are mapped to the same digits "468 227." Having such a numerically equivalent query that is mapped to multiple stored text queries can create ambiguities, which can be resolved by the system, as described in the next few steps.

In step 312, stored text queries are linked to the corresponding numerically equivalent query selected in step 310. For example, stored text queries such as "HOT CAR," "IOU CAP," and potentially many others are "mapped" to the numerically equivalent query "468 227."

In one implementation, the mapping is accomplished by storing the entries in a table such as the mappings table 115 in FIG. 1, in which a separate row is added for each of the stored text queries, such as "HOT CAR" and "IOU CAP." In addition, the system can assign the value "468 227" to the numeric query column 114 for each of the newly created rows "HOT CAR" and "IOU CAP."

In step 314, the system determines the frequency that each of the linked text queries occurs in the query log. For example, referring to FIG. 2, the conversion process can use the text query frequency calculator 216 to count the frequencies of stored text queries such as "BAY" and "CAW" in the query logs 218. In this example, many other stored text queries mapped to the numerically equivalent query "229" may exist, but only "BAY" and "CAW" are listed here.

In step 316, the system maps the most popular stored text query identified in step 312 to the numerically equivalent query selected in step 310. For example, if the numerically equivalent query is "229," the primary mapper 214 (FIG. 2) can compare the frequencies of the corresponding stored text queries "BAY" and "CAW." In certain implementations, when comparing the frequencies of the two queries, the mapper may also take into account the time at which these queries were made, giving higher weight to queries that were made recently. In particular, if the frequency for "BAY" exceeds that of "CAW," the primary mapper 214 can identify "BAY" as the most popular stored text query associated with the numerically equivalent query "229." The conversion process can achieve this mapping by updating the "BAY" row in mappings table 115.

In optional step 318, the system maps additional stored text queries identified in step 312 to the numerically equivalent query selected in step 310. For example, referring to FIG. 2, the mappings table 115 shows both "BAY" and "CAW" as text queries mapped to the numeric query "229." However, mappings table 115 can use the frequency ranking column 126 to identify the most popular stored text query ("BAY") as well as the less popular text queries such as "CAW." In particular, "BAY" has a frequency ranking of 1, identifying it the most popular text query, and "CAW" has a ranking of 2, identifying it as occurring with the second highest frequency. Other additional stored text queries not shown here may have frequency rankings of 3, 4, 5, and so on, depending on their frequencies in the query logs 108.

In step 320, the system determines if additional numerically equivalent queries remain to be processed. If so, the system selects another numerically equivalent query for processing, as shown in step 310. Otherwise, the conversion process ends.

Figure 4:
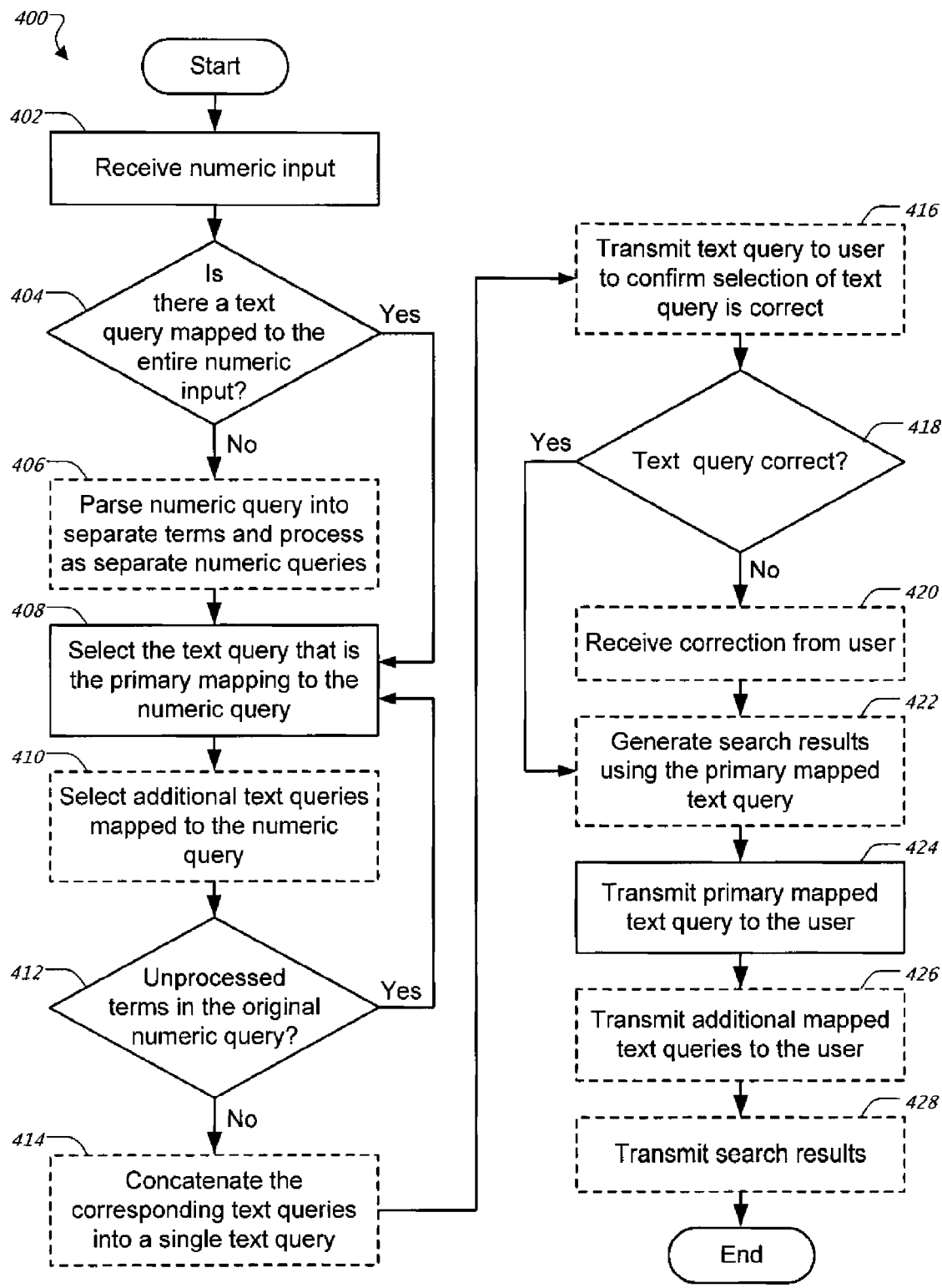
FIG. 4 is a flow chart of an illustrative method for processing numeric queries using numeric-to-text query mappings.

FIG. 4 is a flow chart of an illustrative method 400 for processing numeric queries using numeric-to-text query mappings. For example, referring to FIG. 1, the server 104 can use the mappings 102 to convert numeric queries 108 it receives from the computing devices 106 into textual queries.

Processing can start in step 402 when the system receives a numeric input representing a search query composed of numeric terms. For example, referring to FIG. 1, the server 104 may receive a numeric query 108 such as "468 227" representing "HOT CAR" from a user running a web browser 110 on a computing device 106, such as a cellular phone. The search query here is a numeric query generated using the cellular phone's keypad.

In step 404, the system determines if there is a text query that maps to the entire numeric input received in step 402. For example, referring to FIG. 1, upon receipt of a numeric query 108 such as "468 227," the query processor 112 can search the numeric-to-text query mappings 102 for a corresponding entry. In particular, the query processor 112 can look for a row having "468 227" in its numeric query column 114. If the query processor 112 finds a matching row, processing can proceed to step 408. Otherwise, processing can continue to step 406.

In optional step 406, the system parses the numeric query into separate terms to be processed as separate numeric queries. For example, referring to FIG. 1, the query processor 112 may receive a query such as "228 227" (e.g., representing "BAT CAR") for which step 404 determines that no matching entry exists in the numeric-to-text query mappings 102. Consequently, the processing of step 406 can include parsing the numeric query "228 227" into its constituent terms "228" and "227," representing "BAT" and "CAR," respectively. These separate terms can then be processed in the next step. In another example, the query processor 112 may receive a query such as "468 227" (e.g., representing "HOT CAR"). In this case, the query processor 112 can locate a matching entry in the numeric-to-text query mappings 102 without splitting the numeric query "468 227" into separate terms.

In step 408, the system selects the primary text query that is mapped to the numeric query. The selected primary text query may correspond to the entire numeric query or a portion of the numeric query (if the numeric query has been split into two or more terms as described in association with the step 406). While performing this step, the system can use the entire numeric query that step 404 determined to have a matching text query, or the system can use a numeric query representing a separate term resulting from step 406. For example, the query processor 112 of FIG. 1 can select the text query "HOT CAR" from the row in mappings table 115 corresponding to the numeric query "468 227" determined to exist in step 404. In another example, the query processor 112 can select the text query "BAT" from the row in mappings table 115 corresponding to the numeric query term "228" separated in step 406. In the latter case, a subsequent execution of step 408 can select the text query "CAR" corresponding to the second numeric query term "227" of the numeric query "228 227" representing "BAT CAR." In each case, the query processor 112 locates the entry in the mappings table 115 having the highest frequency ranking 126, such highest ranking 126 designating the entry as the "primary" mapped text query.

In optional step 410, the system selects additional text queries mapped to the numeric query. The text queries selected here may be less likely to correspond to the user's intent when launching the numeric query, but these additional queries can be included with the primary mapped text query when results are returned to the user. If the primary mapped text query selected by the query processor 112 later turns out to be incorrect, the user may be able to locate the intended text query from a list of additional text queries mapped to the same numeric query. For example, if the user issues a numeric query "229" intending to search for "CAW," the query processor 112 may instead return "BAY" if it has the highest frequency ranking in the mappings table 115. By executing optional step 410, the system can return alternate text queries to the user. For example, when selecting additional text queries for the numeric query "229," the query processor 112 would also select the "CAW" text query, and return it to the user for selection of the intended text query.

In step 412, the system determines if there are terms remaining in the numeric query that are unprocessed. This may occur if processing associated with the step 406 parses a numeric query into its constituent terms, and one or more terms remain to be processed. If additional terms need to be processed, processing can repeat steps 408 and 410. Otherwise, processing can proceed to the next step.

In optional step 414, if the numeric query was split for processing, the system concatenates the text queries corresponding to the numeric queries and/or associated query terms into a single text query. For example, referring to FIG. 1, the query processor 112 can concatenate the text query terms "BAT" and "CAR" to form a single text query "BAT CAR" corresponding to an original numeric query 108 such as "228 227" issued from the computing device 106.

In optional step 416, the system transmits the text query resulting from step 414 to the user for confirmation that the converted text query is correct. For example, referring to FIG. 1, in response to a numeric query "228 227," the server 104 transmits the associated text query 118, such as "BAT CAR," to the computing device 106 (e.g., the user's cellular phone). A browser 110 running on the computing device 106 can then display the received associated text query 118 in the associated text query field 122. In particular, after a user enters a numeric search query "228 227" using the cellular phone's numeric keypad, the system can transmit the associated text query back to the user and the user would see "BAT CAR," which is displayed in the associated text query field 122. In certain implementations, an additional field (not shown) can display the user's original numeric query for reference purposes.

In step 418, the system receives input from the user specifying whether the transmitted text query from step 416 is correct. For example, referring to FIG. 1, if "BAT CAR" displayed in the associated text query field 122, is the correct text query (e.g., it is the text query intended by the user), the user can input a confirmation (e.g., select a key, such as the pound (#) key). Otherwise, the user can input a rejection (e.g., select the star (*) key). If the entry is rejected, correction of the entry can occur in the next step, which can be skipped if the entry is already correct.

In optional step 420, the system receives inputs from the user for correcting the incorrect text query. For example, referring to FIG. 1, if the user receives an associated text query "BAY" for a numeric query 108 such as "229" intended by the user to represent "CAW," the user can use controls on the computing device 106 to correct the entry. In certain implementations, the correction process can involve selecting a different text query from a list of choices of text queries corresponding to the original numeric query. For example, the browser 110 may include an additional area for displaying a list of alternate text queries in addition to "BAY." The area may be adjacent to the associated text query field 122. From the list of alternate text queries the user can select the intended text query ("CAW") using other controls on the computing device 106, such as arrow keys, to navigate through the list and make a selection.

In optional step 422, the system generates search results using the primary mapped text query. For example, referring to FIG. 2, the response formatter 208 includes search results obtained from the search engine 206 in the response sent to the user. In certain implementations, the system may automatically generate search results with the associated text query 118 without waiting for user confirmation that the associated text query 118 is correct. For example, the system 100 may generate search results when only one text query is mapped to the user's numeric query. In another example, if frequency information for a first text query exceeds frequency information for a second text query by a predetermined amount—which signifies the first text query is much more likely to be the intended text than the second text query— search results associated with the first text query can be returned. Alternatively, the system may have a default action, where search results associated with the primary text query are returned to the user.

In step 424, the system transmits additional mapped text queries to the user. For example, in addition to transmitting "BAT CAR" as the text query most likely corresponding to the user's numeric query "228 227," the system transmits the remaining mapped text queries that have a high frequency of occurrence in previously submitted text search queries, such as "IOU CAR," to the client device 106 employed by the user.

In optional step 426, the system transmits the search results that were generated by the server 104 in step 422. Such search results may be, for example, included with the associated text query 118 transmitted to the client device 106. For example, in response to a numeric query such as "228 227," the system 100 can transmit search results related to "BAT CAR".

In step 428, the system transmits the search results to the originator of the numeric query. For example, referring to FIGS. 1 and 2, the server 104 transmits the search results formatted by the response formatter 208 through the interface 204 as search results 120 to be received by the computing device 106. An application, such as a browser 110, running on the computing device can display the search results 120 in the search results field 124.

Figure 5:
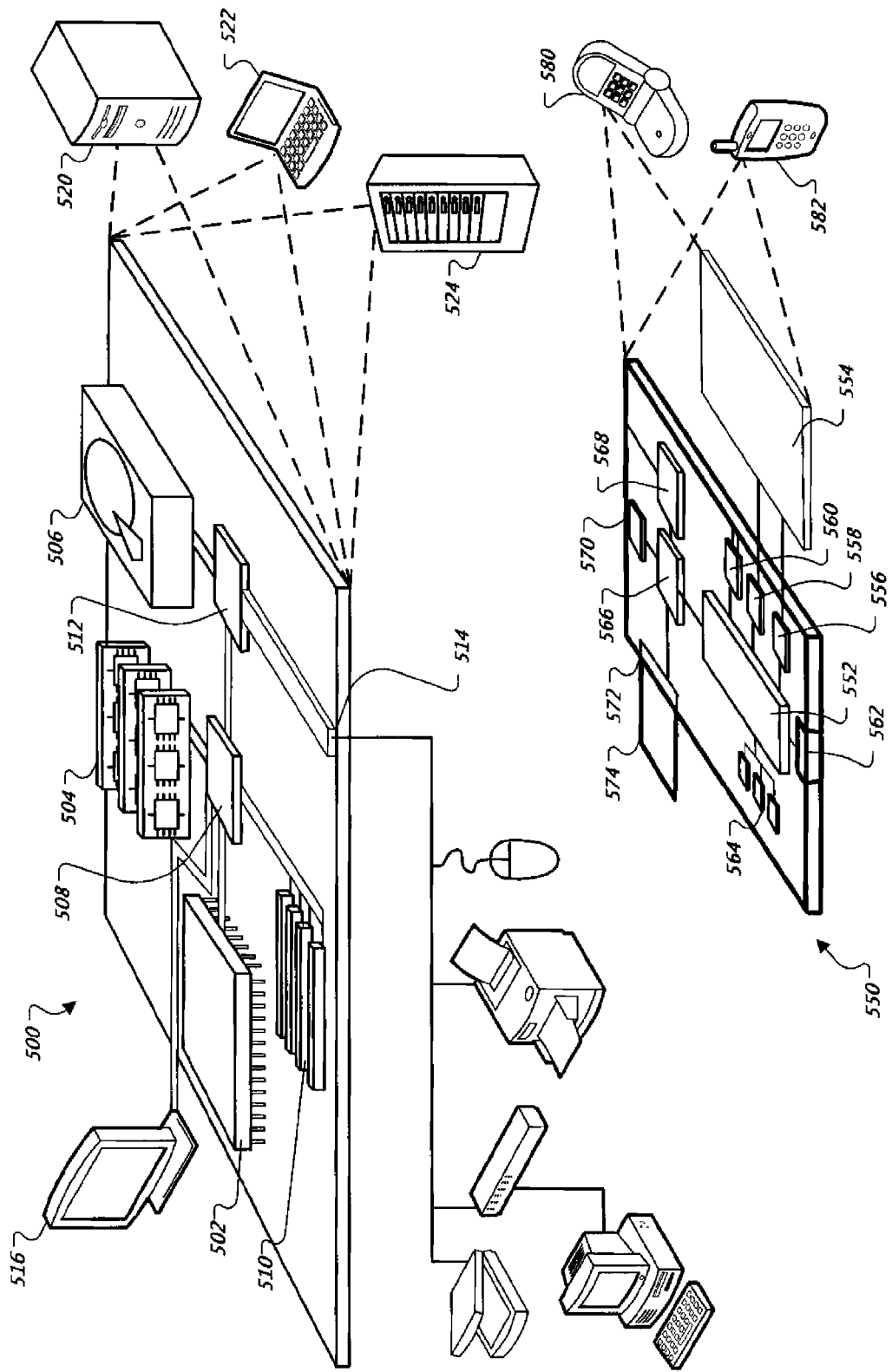
FIG. 5 is a schematic diagram of a general computer system and an example mobile device.

FIG. 5 is a schematic diagram of a general computer system and an example mobile device. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the embodiments described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the embodiments. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method, implemented by a server computer system, for matching text queries to corresponding numerical queries, the method comprising:
   receiving, at the server computer system, a plurality of text queries, the text queries having been submitted to a search engine by a plurality of different users;
   translating, by the server computer system, each text query of the plurality of text queries into a numerical representation, the translation including mapping text symbols that form each text query into numbers in accordance with a keypad standard that specifies associations between the text symbols and the numbers, wherein at least some of the text queries translate into the same numerical representation;
   identifying, by the server computer system, a primary mapping for each numerical representation, the primary mapping being a single text query having a highest frequency of occurrence from amongst the text queries in the plurality of text queries that translate into the respective numerical representation; and
   outputting, from the server computer system, the primary mapping of a particular numerical representation in response to receiving a numeric query that comprises the particular numerical representation from a remote device comprising a keypad mapped in accordance with the keypad standard.

2. The method of claim 1, further comprising:
   generating, using a search engine, search results by searching with the primary mapping of the particular numerical representation; and
   transmitting the search results to the remote device from which the numeric query was received.

3. The method of claim 1, further comprising identifying, by the server computer system, one or more additional mappings for the a first numerical representation, the additional mappings being additional text queries that translate into the first numerical representation, wherein the additional mappings are identified in response to determining that the frequencies at which the additional text queries occur in the plurality of text queries exceed a predetermined occurrence threshold.

4. The method of claim 3, further comprising outputting the additional mappings with the primary mapping.

5. The method of claim 3, further comprising displaying the additional mappings at the remote device, the displaying comprising highlighting a first additional mapping having a higher frequency of occurrence in the plurality of text queries that translate into the numerical representation in the output relative to a second additional mapping having a lesser frequency of occurrence in the plurality of text queries that translate into the numerical representation.

6. The method of claim 1, wherein outputting comprises transmitting the primary mapping to the remote device.

7. The method of claim 1, further comprising:
   generating a search result by searching with the primary mapping to generate a search result; and
   transmitting the search result to the remote device.

8. The method of claim 1, wherein the primary mappings are identified on a recurrent basis so that the text queries having the substantially highest frequency of occurrence in the plurality of text queries that translate into each respective numerical representation are updated.

9. The method of claim 1, further comprising:
   parsing, by the server computer system, a text query in the plurality of text queries that comprises multiple words into its constituent words; and
   treating each constituent word as an individual text query.

10. The method of claim 1, wherein the numeric query received from the remote device comprises a symbol indicating that the numeric query includes more than one term.

11. The method of claim 10, further comprising:
    determining that a first text query has been previously translated into a first numerical representation that is substantially the same as the numeric query that includes the more than one term; and
    in response thereto, selecting the primary mapping corresponding to the first numerical representation for the outputting.

12. The method of claim 10, further comprising:
    determining that none of the plurality of text queries have been previously translated into a numerical representation that is substantially the same as the numeric query that includes more than one term;
    selecting a respective primary mapping that corresponds to each term of the numeric equivalent query that includes more than one term; and
    concatenating the respective primary mappings for the outputting.

13. The method of claim 12, wherein selecting the respective primary mapping that corresponds to each term of the numeric equivalents comprises favoring combinations of primary mappings that have a higher frequency of occurrence over combinations with a lesser frequency of occurrence.

14. The method of claim 1, wherein the keypad standard is selected from a group consisting of an International Keypad Standard, a North American Classic Keypad Standard, an Australian Classic Keypad Standard, a United Kingdom Classic Keypad Standard, and a Mobile 1 Keypad Standard.

15. The method of claim 1, wherein the received text queries are constrained to text queries submitted to the search engine in a particular search context.

16. The method of claim 15, wherein the search context is one of a news search context, a merchandise search context, a general web page search context, a location search context, an image search context, a news group search context, and a device search context.

17. The method of claim 1, wherein the received text queries used in generating numerically equivalent queries are constrained to text queries submitted to the search engine in a particular language or a particular country.

18. The method of claim 1, further comprising:
    receiving text from a text corpus; and
    using the received text to identify the numerical representations and to identify the primary mappings.

19. The method of claim 1, wherein the remote device is a mobile device.

20. The method of claim 1, further comprising transmitting, from the server computer system to the remote device, a query to correct a misspelling to the user if the primary mapping identified for the numeric query received from the remote device comprises a misspelling.

21. The method of claim 1, further comprising using a stored profile that includes text queries associated with a user of the remote device to weight frequencies of occurrences for text queries that are related to the text queries associated with the user so that the text queries that are related to the text queries associated with the user are output more frequently in response to numeric queries received from the user.

22. The method of claim 1, wherein:
the received plurality of text queries includes at least some multiple term search queries;
the multiple term search queries are each translated into a respective numerical representation that represents the entire multiple term search query, wherein at least some of the multiple term search queries translate into a same respective numerical representation.

23. The method of claim 22, wherein:
a first of two or more of the multiple term search queries that translate into the same respective numerical representation is identified as the primary mapping for the same respective numerical representation.

24. The method of claim 23, wherein:
the first of the multiple term search queries is output in response to the receipt of a first numeric query that comprises the same respective numerical representation.

25. A system comprising:
one or more computers having
means for generating a numerical representation for each of a collection of previously stored text queries by mapping symbols of the text queries into numbers in accordance with a keypad standard that specifies associations between numbers and symbols, the previously stored text queries having been submitted to a search engine by a plurality of different users, wherein at least some of the text queries generate the same numerical representation;
a frequency calculator programmed to calculate a frequency of occurrence for each stored text query in the collection of text queries; and
a mapper programmed to identify a primary mapping of a numeric query received from a remote device comprising a keypad mapped in accordance with the keypad standard, the primary mapping being a single text query of the collection having a highest frequency of occurrence in the collection from among the text queries of the collection for which the means for generating has generated a first numerical representation that matches the numeric query.

26. The system of claim 25, wherein the means for generating the numerical representations is programmed to:
generate numerical representations that each respectively represent an entire multiple term text query, wherein at least some of the multiple term text queries generate a same respective numerical representation.

27. The system of claim 26, wherein the means programmed to identify a first of the multiple term text queries that generate the same respective numerical representation as the primary mapping of a subsequent numeric query received from a remote device.

28. A method for matching text queries to corresponding numerical queries implemented by a server data processing system, the method comprising:
receiving, at the server system, a plurality of textual search queries submitted to a search engine by a plurality of different users;
translating, by the server system, each of the textual search queries into an ambiguous numerical representation using a keypad standard that specifies associations between symbols in the textual search queries and numbers, wherein at least some of the textual search queries translate into the same numerical representation;
receiving, at the server system, a current ambiguous numerical search query from a remote device comprising a keypad mapped to the keypad standard;
mapping, by the server system, the current ambiguous numerical search query to one or more current textual search queries using the translations of the textual search queries into the ambiguous numerical representations; and
outputting, from the server system, the one or more of the current textual search queries to which the current ambiguous numerical search query has been mapped.

29. The method of claim 28, wherein mapping the current ambiguous numerical search query to the one or more of the current textual search queries comprises:
identifying frequency rankings characterizing numbers of times each of the current textual search queries have been submitted to the search engine by the plurality of different users; and
mapping the current ambiguous numerical search query into the current textual search queries having a frequency ranking that exceeds a threshold and refraining to map the current ambiguous numerical search query into the current textual search queries having a frequency ranking that fails to exceed the threshold.

30. The method of claim 29, further comprising:
weighting the frequency rankings of the current textual search queries using a profile that profiles search queries associated with a user of the remote device, wherein the profile is stored in a data storage device accessible to the server system.

31. The method of claim 28, wherein outputting the one or more of the current textual search queries comprises transmitting a single primary mapped text query having the highest frequency ranking to the remote device and refraining to transmit other current textual search queries.

32. The method of claim 28, wherein:
the received plurality of textual search queries includes at least some multiple term textual search queries;
the multiple term textual search queries are each translated into a respective ambiguous numerical representation that represents the entirety of the multiple term textual search query, wherein at least some of the multiple term textual search queries translate into a same respective ambiguous numerical representation; and
a first of the multiple term textual search queries is output in response to the receipt of a current multiple term ambiguous numerical search query

* * * * *

UNITED STATES PATENT AND TRADEMARK OFFICE
CERTIFICATE OF CORRECTION

PATENT NO. : 7,979,425 B2
APPLICATION NO. : 11/552751
DATED : July 12, 2011
INVENTOR(S) : Ashutosh Garg and Mayur Datar It is certified that error appears in the above-identified patent and that said Letters Patent is hereby corrected as shown below:

Col. 19, line 49; in Claim 3, after "the" delete "a".

Col. 21, line 57; in Claim 27, delete "means" and insert -- mapper --.

Col. 22, line 59; in Claim 32, delete "query" and insert -- query.--.

Signed and Sealed this
Twenty-second Day of November, 2011

David J. Kappos
*Director of the United States Patent and Trademark Office*